Figure 20:
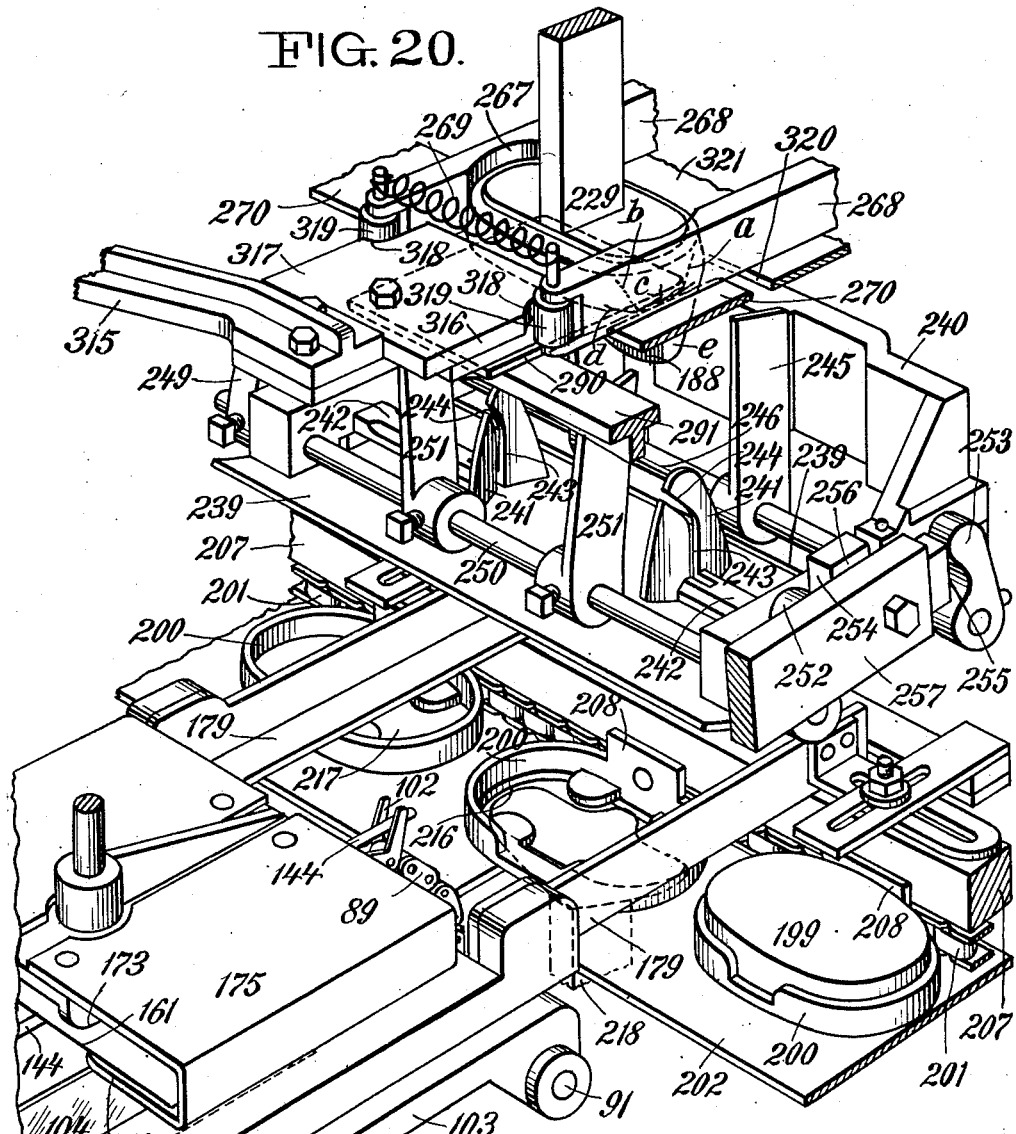

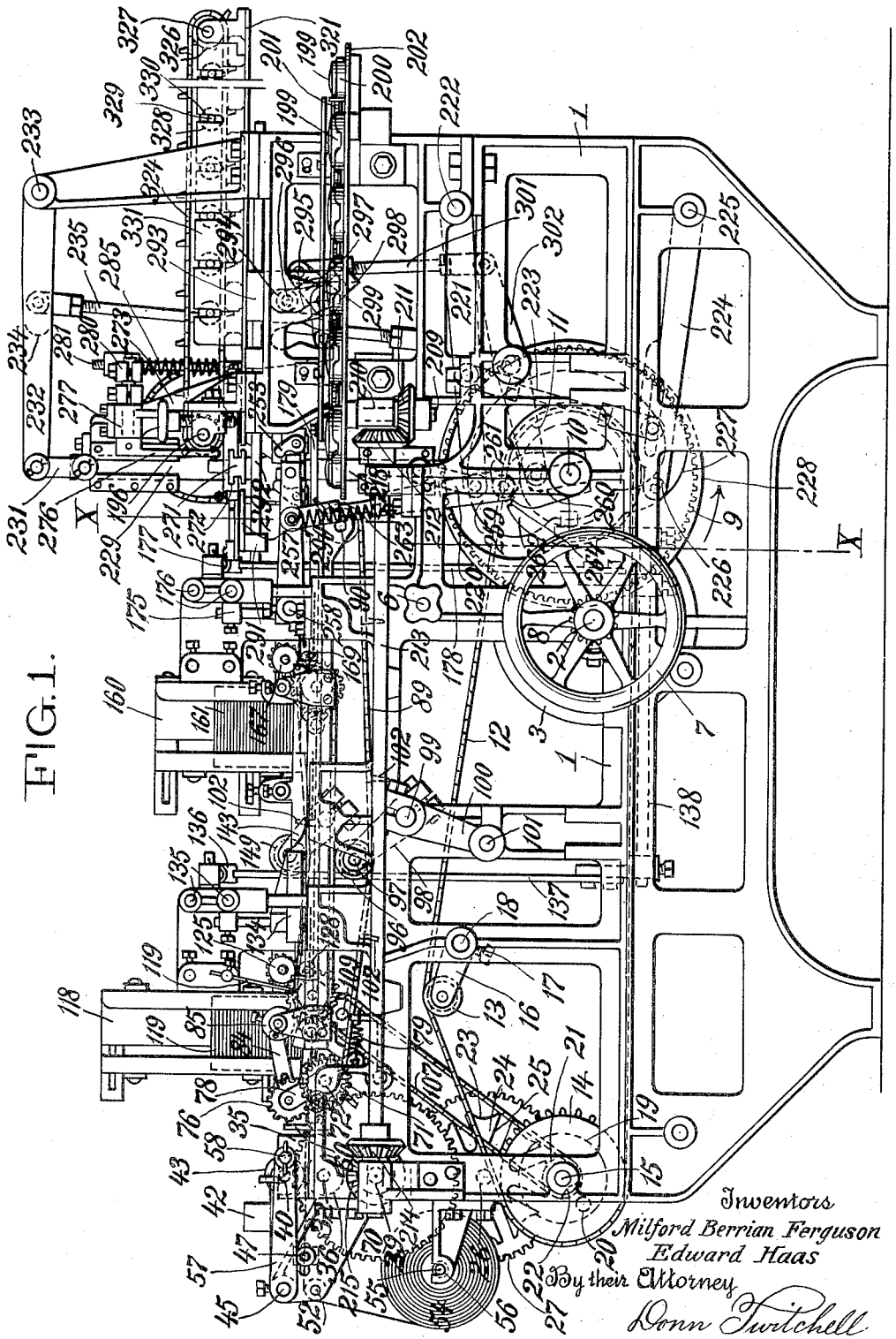

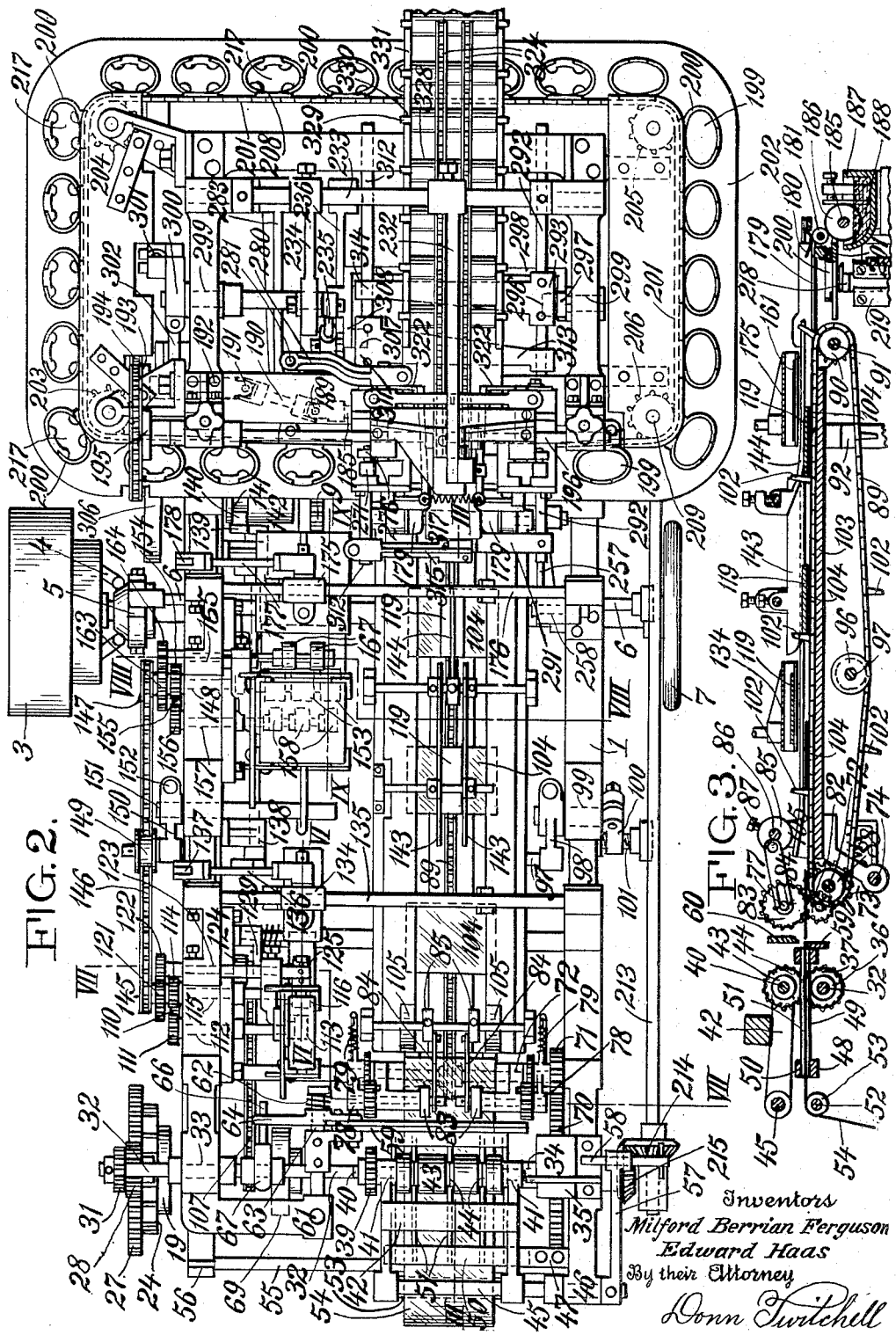

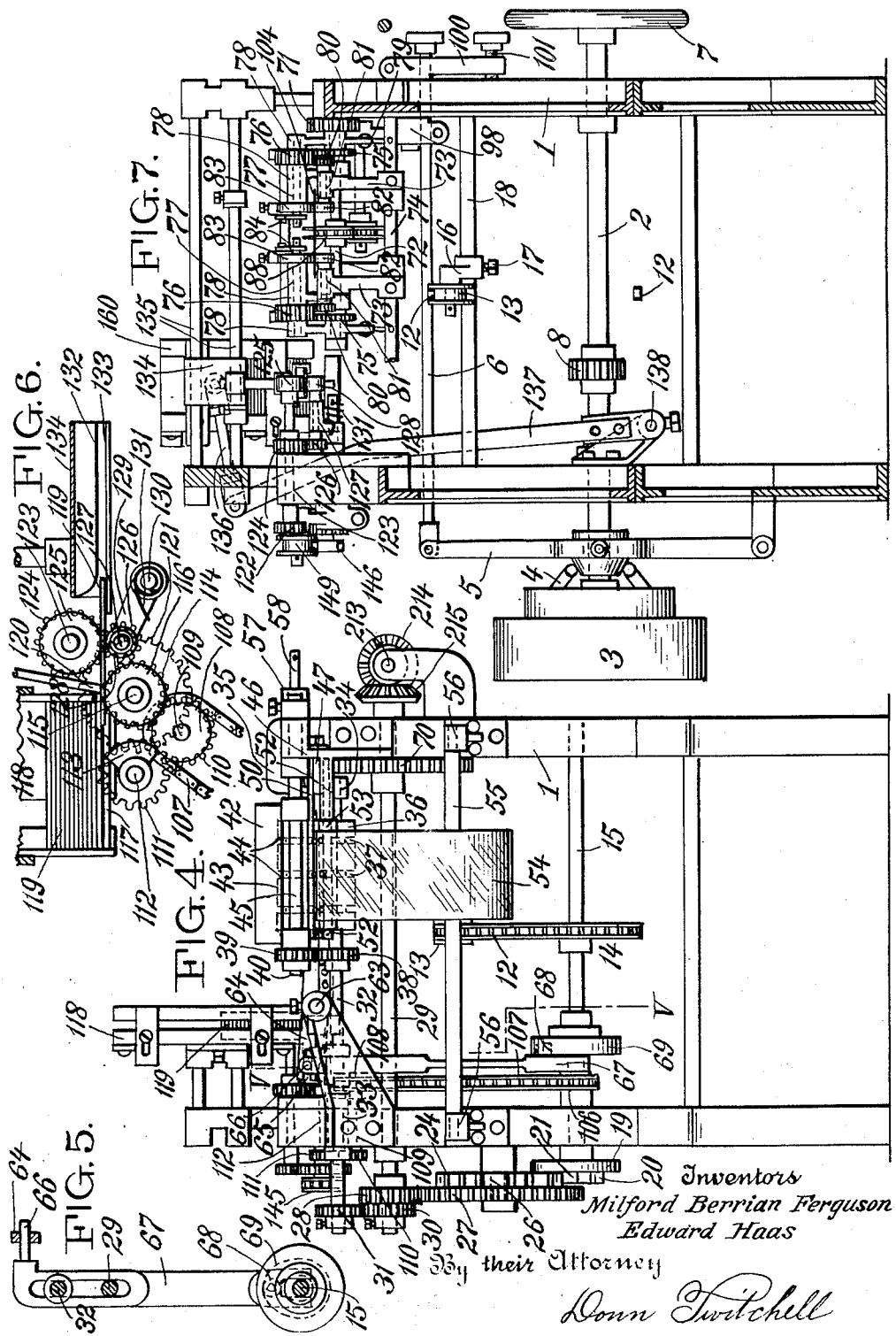

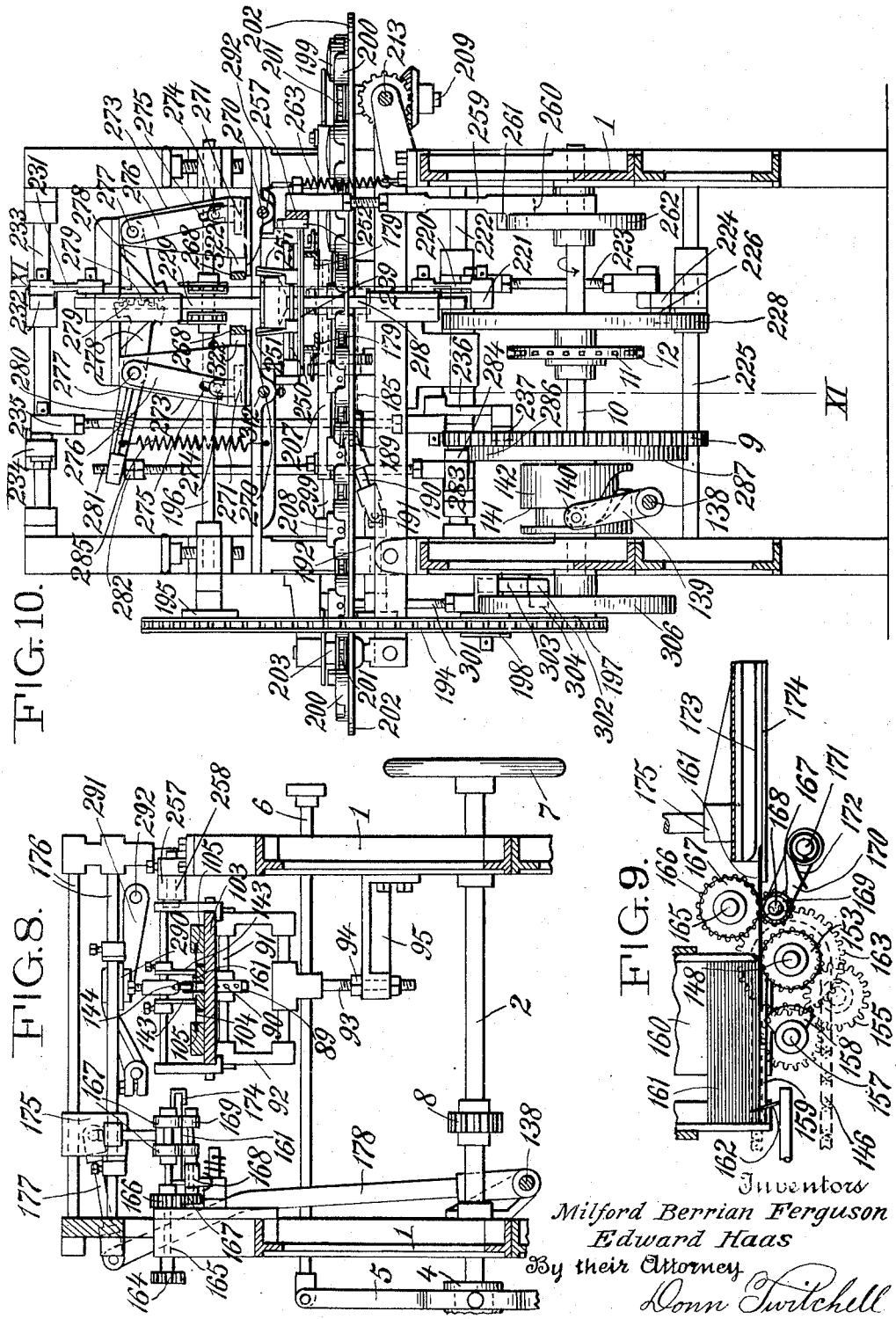

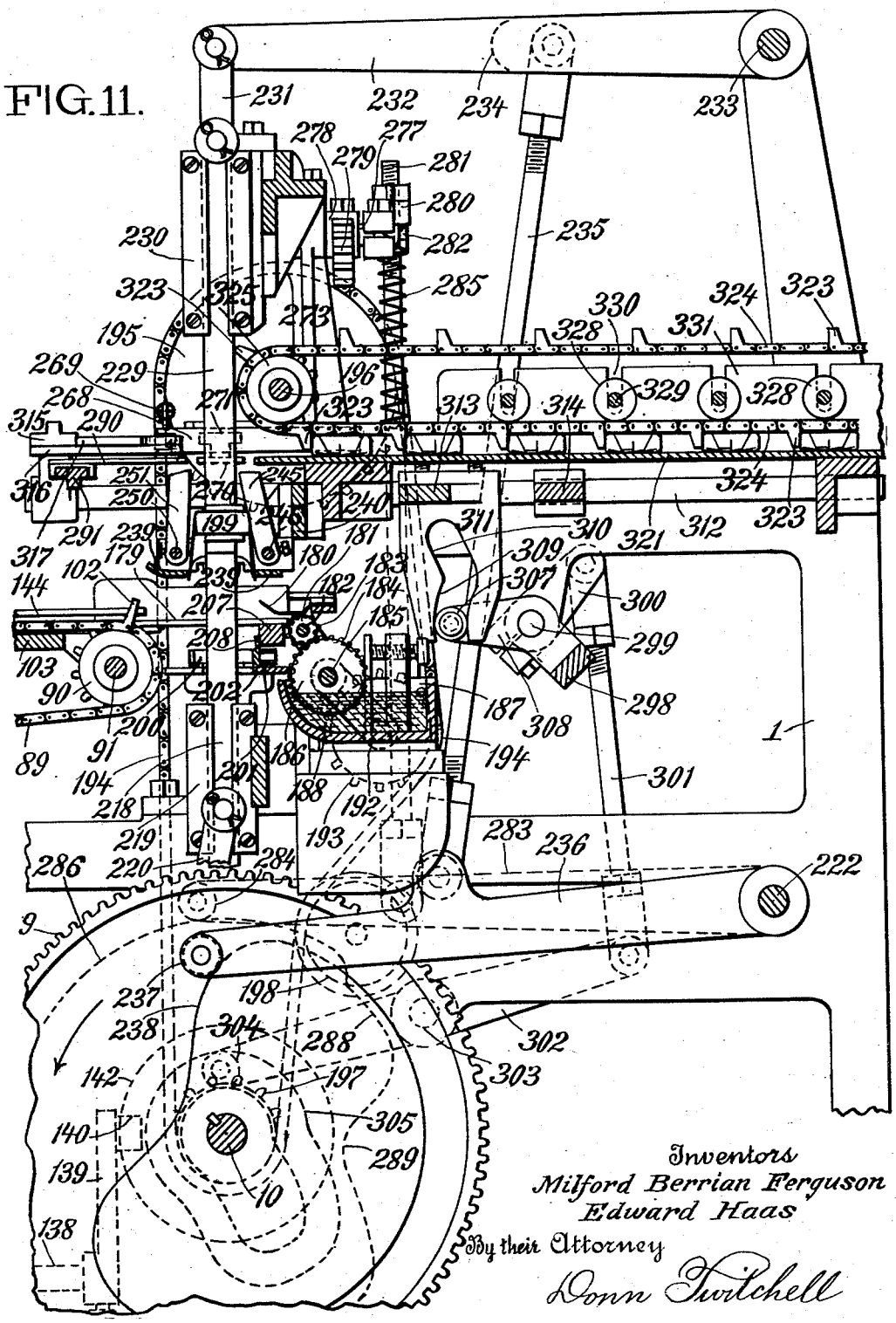

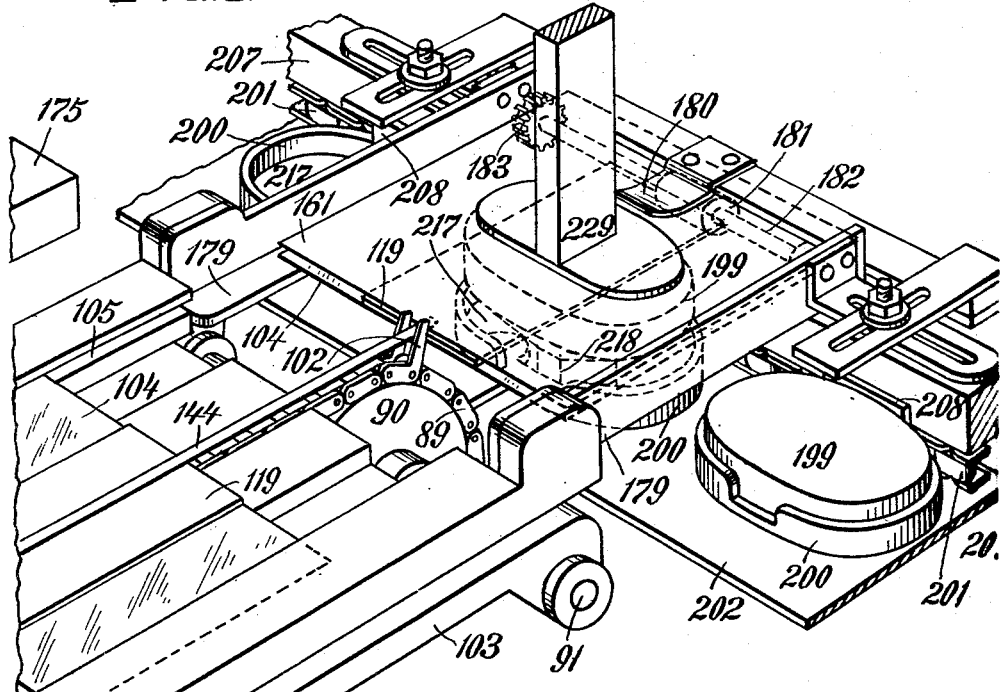
FIG.12.
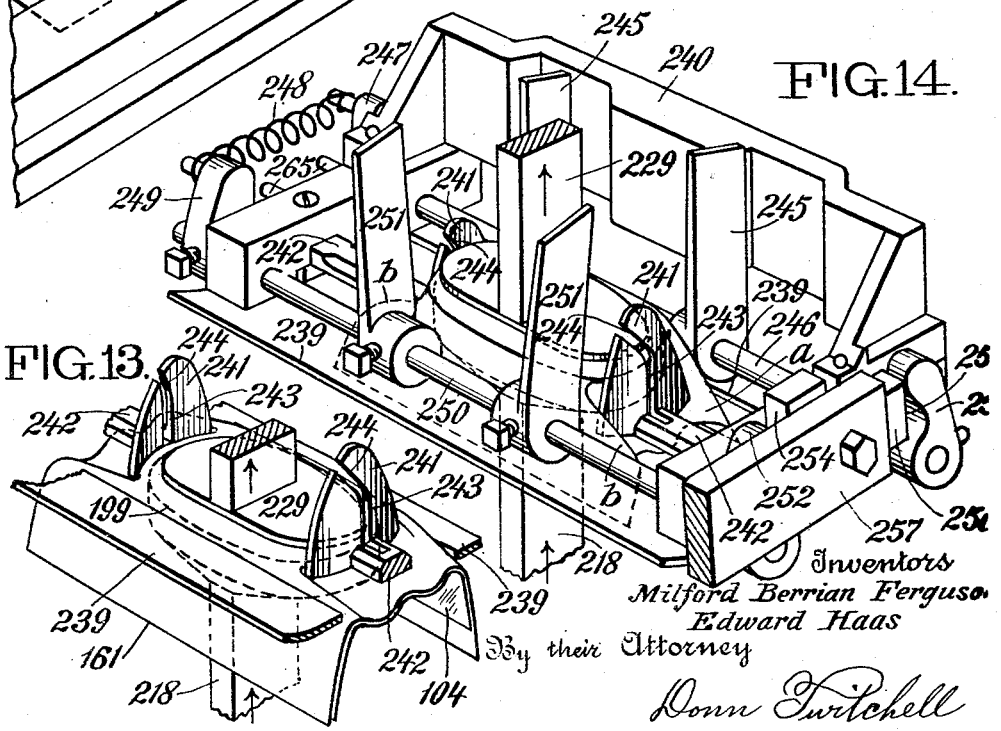
FIG.14.
FIG.13.
Inventors
Milford Berrian Ferguson
Edward Haas
By their Attorney

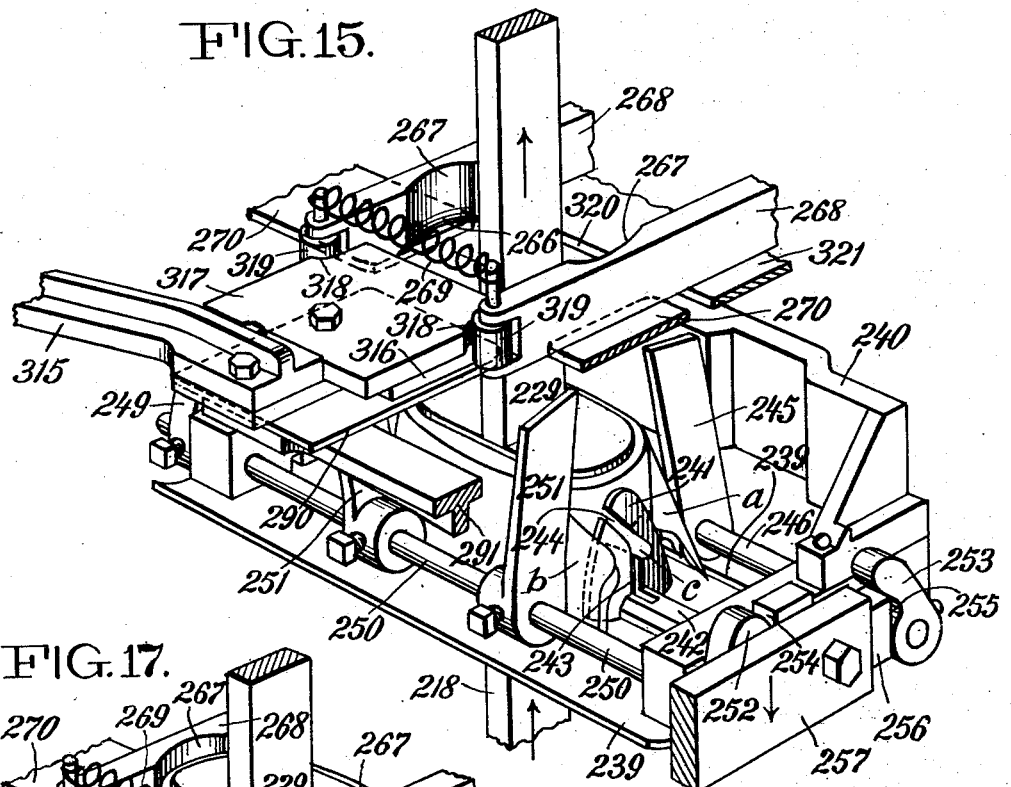

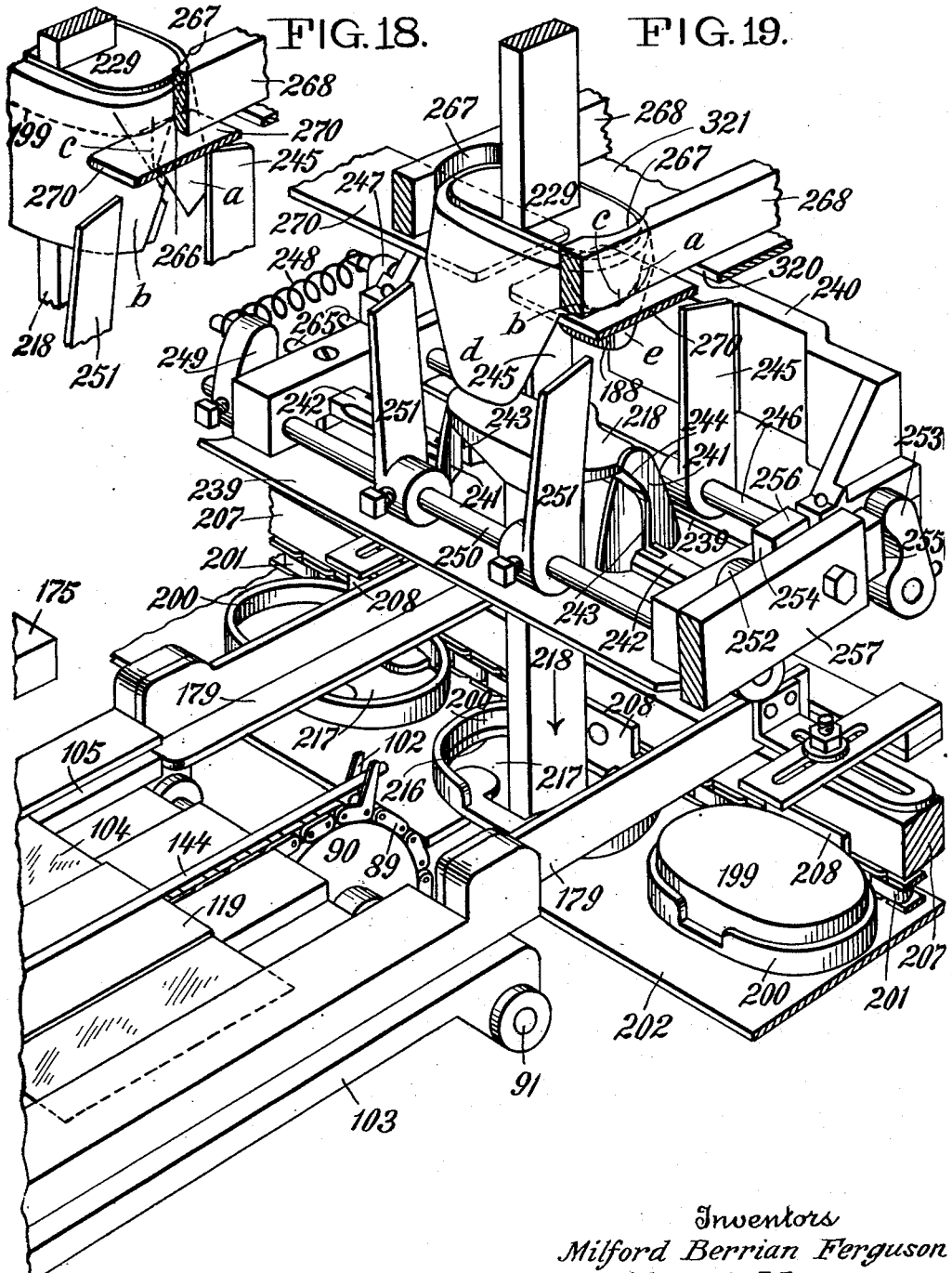

Oct. 20, 1925. 1,557,574
M. B. FERGUSON ET AL
WRAPPING MACHINE
Filed Jan. 4, 1921 10 Sheets-Sheet 9

Inventors
Milford Berrian Ferguson
Edward Haas
By their Attorney
Donn Twitchell

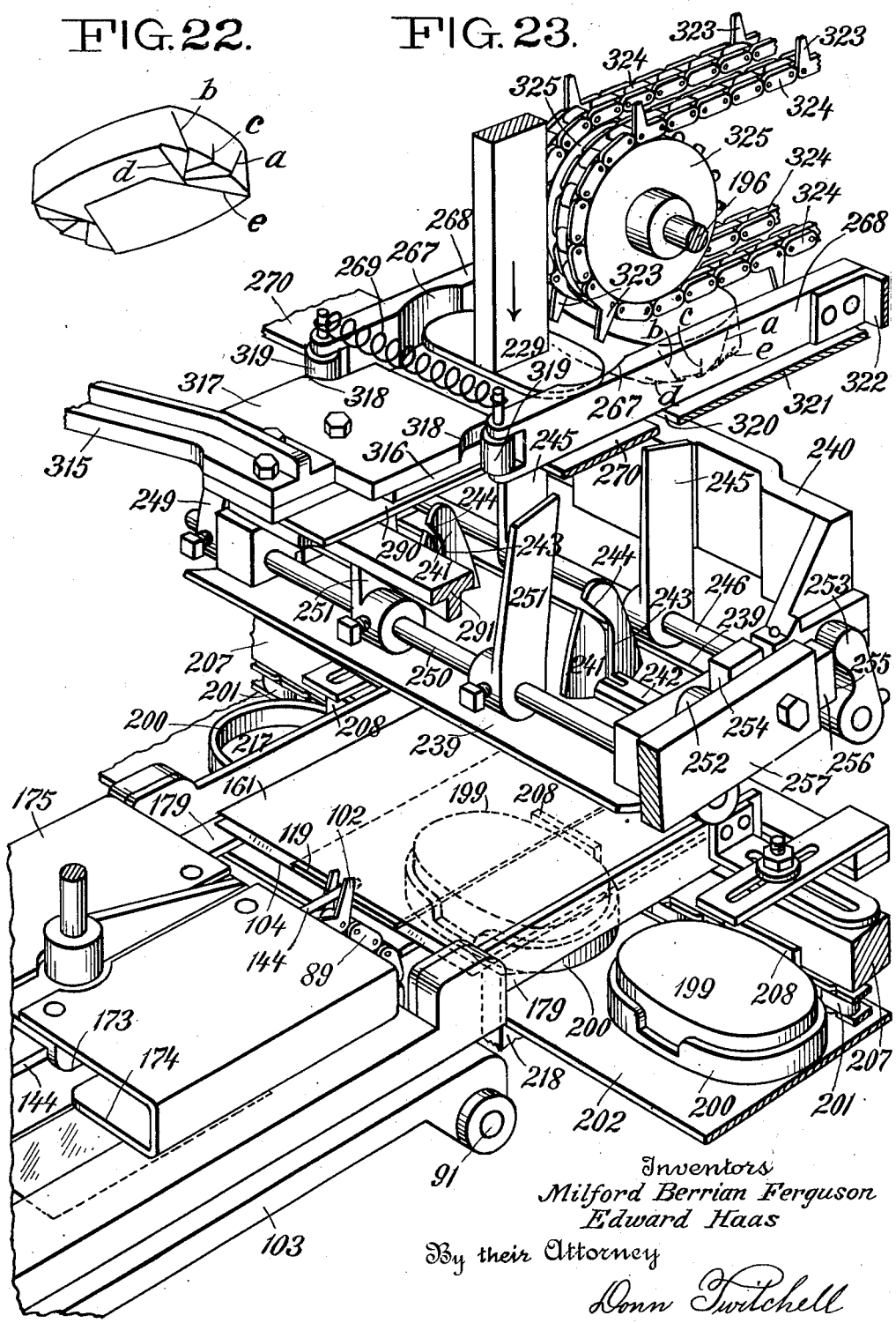

Patented Oct. 20, 1925.

1,557,574

UNITED STATES PATENT OFFICE.

MILFORD BERRIAN FERGUSON AND EDWARD HAAS, OF BROOKLYN, NEW YORK.

WRAPPING MACHINE.

Application filed January 4, 1921. Serial No. 434,912.

*To all whom it may concern:*

Be it known that we, MILFORD BERRIAN FERGUSON and EDWARD HAAS, citizens of the United States, and residents of the borough of Brooklyn, city of New York, in the county of Kings and State of New York, have invented certain new and useful Improvements in Wrapping Machines, of which the following is a specification.

This invention relates to machines having means for conveying a number of wrappers to a carrier which is arranged to deliver the wrappers to mechanism adapted for forcing an article and said wrappers through folding devices, whereby the wrappers are folded upon the article.

The object of the invention is to provide means for assembling and controlling wrappers of different widths delivered to said carrier, and to provide wrapper folding devices adapted for folding said wrappers around an article having rounded ends, or having square or irregular shaped ends.

The invention consists of an intermittently moving endless chain having a series of arms which engage inner wrappers delivered thereto by a conveyor from a paper feeding mechanism, in combination with a conveyor moving transversely to the line of travel of said chain and adapted to move a coupon wrapper into position for engagement by one of said arms having an inner wrapper in advance thereof; and a second transversely moving conveyor adapted to move an outer wrapper into position for engagement by said arm having said inner and coupon wrapper in advance thereof; guides being provided for controlling said wrappers as they are moved forward by said chain onto supports placed in range with the wrapper folding devices.

A paste applying device is provided, whereby paste is applied to the under side of one end of the outer wrapper.

A wrapper retaining slide is provided having vertical reciprocating movement and adapted at the end of its movement in downward direction to come to rest on the upper side of said wrappers.

The invention further consists of a second intermittently moving endless chain carrying a series of frames adapted for supporting articles to be wrapped and arranged so that at the end of each intermittent movement, one of said articles is brought to rest below said wrappers.

A plunger is provided having vertical reciprocating movement in line with the slide above the wrappers and adapted at the end of its movement in downward direction to come to rest below said article.

The invention further consists of stationary side and end folders, the end folders being shaped to conform to the form that may be desired to give to the end of the wrapped article, the middle of each end folder having a slot extending parallel to the longitudinal axis of said plunger, and joining a slot that is inclined toward one of the side folders, so that when the plunger moves upward it forces said article and wrapper between said folders causing a surplus of wrapper to overhang the ends of the article, which surplus is folded by means of said slots.

The invention further consists of improved wrapper folding mechanism, whereby the wrapper is further folded upon the article.

The invention also consists of an endless chain carrying a series of arms, one of said arms adapted during movement of the chain to take against the wrapped article and move it forward along a receiving channel, means being provided for pressing said chain against the wrapped articles.

In the accompanying drawings:

Fig. 1—is a side elevation of the machine.

Fig. 2—is a plan view.

Fig. 3—is a section on the line III—III of Fig. 2, the transversely moving conveyors being shown in a different position from that shown in Fig. 2.

Fig. 4—is an end elevation of the machine.

Fig. 5—is a section approximately on the line V—V of Fig. 4.

Fig. 6—is a section on the line VI—VI of Fig. 2.

Fig. 7—is a section on the line VII—VII of Fig. 2.

Fig. 8—is a section on the line VIII—VIII of Fig. 2.

Fig. 9—is a section on the line IX—IX of Fig. 2.

Fig. 10—is a section on the line X—X of Fig. 1.

Fig. 11—is a section approximately on the line XI—XI of Fig. 10.

Fig. 12—is a perspective view of a portion of the machine, showing the position of parts when the wrapper carrier chain has moved the wrappers into range with the folding devices, and the article carrying chain has moved an article to rest between the wrappers and the plunger, and upward movement of the plunger has moved the article up against the wrappers.

Figs. 13, 14, 15 and 16,—are perspective views showing successive steps in forming end folds and side end flaps of the wrapper caused by upward movement of the article and wrappers between the stationary folders.

Fig. 17—is a perspective view showing how certain parts of said wrapper folding mechanism cause said side end flaps to be folded against the article.

Fig. 18—shows said folds and means for supporting the article and wrappers when the plunger has reached the end of its upward movement.

Fig. 19—is a perspective view showing downward movement of the plunger away from the article and wrapper, and also showing how certain other parts of said wrapper folding mechanism cause said end folds and folded side end flaps to be folded under said article.

Fig. 20—is a perspective view showing the position of parts when another part of said wrapper folding mechanism has folded one side flap of the wrapper under the article and also showing the plunger at the end of its downward movement, and a transversely moving conveyor with the outer wrapper in position to be moved by said chain along with the coupon and the inner wrapper into range with the folding devices.

Figure 21:
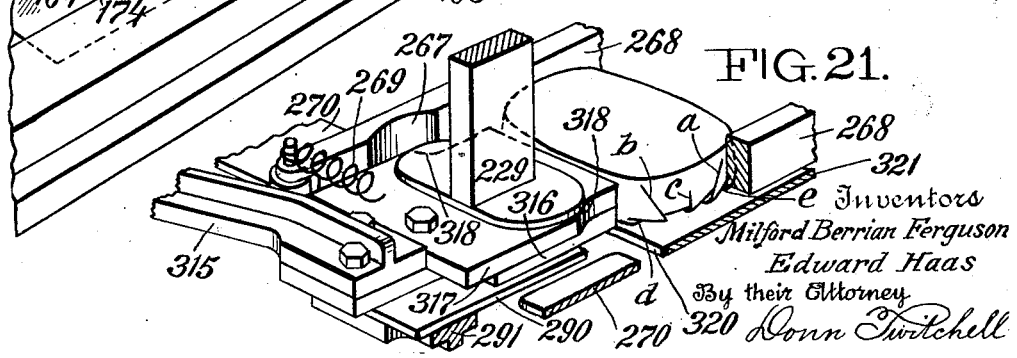

Fig. 21—is a perspective view showing how the other side flap of the wrapper is folded under the article when the article and wrapper are moved into the receiving channel.

Fig. 22—is a perspective view of the wrapper when completely folded upon the article.

Fig. 23—is a perspective view, showing the position of parts when the completely wrapped article is engaged by arms of the chain which force it along the receiving channel, and when the wrapper carrier chain has just moved the wrappers into range with the folding devices, and the article carrying chain has just moved an article to rest between the wrappers and the plunger.

Mounted in suitable bearings in the main frame 1 is a driving shaft 2 carrying a pulley 3 and a device 4 for clutching the shaft thereto. The clutching device is actuated by means of a lever 5 connected to a sliding rod 6 extending to the front side of the machine, within reach of the operator. The shaft 2 is provided with a hand wheel 7 which is placed on the front side of the machine so that the shaft can be rotated by the operator when desired. Secured to shaft 2 is a small gear wheel 8 which is in mesh with a large gear wheel 9 secured to a shaft 10 which is free to rotate in bearings located near one end of the frame 1.

Secured to shaft 10 is a sprocket wheel 11 over which rides an endless chain 12 riding over an idle pulley 13 and a sprocket wheel 14 which is secured to a shaft 15 rotating in bearings at the other or forward end of the frame 1. The idle pulley 13 is for the purpose of keeping the chain taut and is mounted on a swinging arm 16 which is fastened by means of a set screw 17 to a rod 18 forming part of the frame 1.

Secured to shaft 15 is a disc 19 carrying a pin 20 and a cylindrical extension 21 having the cut-away portion 22 radially in line with the pin, the cylindrical extension 21 during five eighths of a revolution of shaft 15, engaging one of the eight concave surfaces 23 on the wheel 24 of the "Geneva movement" shown, and the cut-away portion 22 at the end of said five eighths of a revolution, permitting the pin 20 of the disc 19 to enter one of the eight slots 25, of the wheel 24, and during the remaining three eighths of a revolution of shaft 15 cause one eighth of a revolution of the wheel 24. The wheel 24 rotates upon a short shaft 26 and forming part of the wheel is a gear wheel 27 in mesh with a pinion 28 so proportioned that one eighth of a revolution of the gear wheel causes one half of a revolution of the pinion. The pinion 28 is secured to a shaft 29 extending transversely across the forward end of the frame 1.

A gear wheel 30 secured to the shaft 29 is in mesh with a gear wheel 31 which is secured to a shaft 32 free to rotate in a bearing 33 and a bearing 34 forming part of a bracket 35 attached to the frame 1. Secured to shaft 32 is a roller 36 having a series of annular grooves 37. Also secured to shaft 32 is a gear wheel 38 in mesh with a gear wheel 39 secured to a shaft 40 which is free to rotate in bearings 41 formed on a swinging frame 42. Secured to shaft 40 is a roller 43 provided with a series of annular grooves 44. The swinging frame 42 is attached to a shaft 45 which is mounted on a bracket 46 secured to the forward end of frame 1. Secured to the bracket 46 is a slide 47 having a lower arm 48 provided with rods 49 which extend horizontally above the roller 36 in the annular grooves 37 thereof and an upper arm 50 provided with rods 51 which extend horizontally below the roller 43 in the annular grooves 44 thereof. Forming part of the bracket 46 is a shaft 52 on which a roller 53 is journalled, and passing over this roller is the paper sheet 54 supplied from a roll which is supported on a shaft 55 resting in bearings 56. The paper 54 passes from roller 53 forward between the rods 49 and 51 which guide the paper between the rollers 36 and 43, the frame 42 carrying the roller 43 swinging up sufficient to permit the paper to pass, and the weight of said frame serving to maintain pressure of the roller 43 against the paper on the roller 36, thereby permitting the roller to move the paper forward, because of the intermeshing gears 38 and 39 which cause the rollers to feed the paper forward at a speed determined by the relative proportions of the gear 30 on shafts 29 and the gear 31 on shaft 32. By removing the gears 30 and 31 and substituting therefor gears differently proportioned, the shaft 32 may be driven at a different speed, thereby causing the rollers 36 and 43 to move the paper forward at a different speed.

The roller 43 may be placed out of action by swinging the frame 42 up so that the gear 39 will be thrown out of mesh with the gear 38; this being accomplished by means of an arm 57 secured to shaft 45 and having a sliding pin 58 which may be moved into engagement with the bracket 35, whereby the frame may be held up. As the paper is fed forward by means of the rollers 36 and 43, it passes between the fixed blade 59 and the movable blade 60 of a pair of scissors which is secured to an arm 61 attached to the frame 1. The movable blade is held against the fixed blade by means of a spring 62 coiled around a shaft 63 on which the movable blade is pivoted. The movable blade is provided with an arm 64 having a slot 65 which is engaged by an arm 66 forming part of a slide 67 which is provided with a roller 68 engaging a cam 69 on shaft 15, whereby the slide is moved vertically, thereby causing the movable blade to be actuated, whereby the paper may be cut. Secured to shaft 29 is a gear wheel 70 in mesh with a pinion 71 so proportioned that every half revolution of shaft 29 causes one and one half revolutions of the pinion. Pinion 71 is secured to a shaft 72 which rotates in bearings formed in two frames 73 which are secured to a rod 74 forming part of the frame 1. Secured to shaft 72 is a gear wheel 75 located near one end of the shaft and a similar gear wheel located near the other end. Each gear wheel 75 is in mesh with a gear wheel 76 having a wide face, which gear is secured to a shaft 77 journaled in a swinging frame 78 pivoted on shaft 72. Springs 79 cause movement of the swinging frames 78 whereby the wide faced gear 76 of each frame is moved into mesh with a small gear wheel 80 secured to each one of shafts 81 journaled in the fixed frames 73. Secured to each shaft 81 is a roller 82 having a diameter equal to the pitch diameter of the small gear wheel 80. Secured to shaft 77 is a roller 83 having a diameter equal to the pitch diameter of gear wheel 76.

When the rollers 36 and 43 feed the paper forward it passes between the two pair of rollers 82 and 83 one pair being placed near each side margin of the paper, the springs 79 serving to maintain pressure of the rollers 83 against the paper on the rollers 82 whereby the rollers will move the paper forward. It will be evident that the rollers 82 and 83 will feed the paper forward at a speed exceeding that of rollers 36 and 43, owing to the fact that the shaft 72 actuating the rollers 82 and 83 is rotated much faster than the shaft 29 actuating the rollers 36 and 43. In order that the greater speed of the feed rollers 82 and 83 will not cause the paper to be wrinkled or torn, a device is provided for limiting the pressure of the rollers 83 upon the paper, which consists of a link 84 pivoted on the shaft 77 of swinging frame 78 and pivoted to a disc 85 which may be rotated on a fixed shaft 86 and fastened thereto by means of a set screw 87.

Secured to shaft 72 is a sprocket wheel 88 located midway between the two rollers 82. Riding over the sprocket wheel 88 is an endless chain 89 riding over a sprocket wheel 90 which is secured to a shaft 91 journaled in bearings at the free end of a swinging frame 92 pivoted on the rod 74. The frame 92 may be raised or lowered by means of a screw 93 and a nut 94 supported on an arm 95 secured to the frame 1. Slack in the chain 89 may be taken up by means of an idle pulley 96 mounted on a shaft 97 forming part of an arm 98 which is secured to a shaft 99 journaled in the frame 1 and provided with an arm 100 having a set screw 101 engaging the frame 1. The chain 89 is provided with a series of arms 102 which are placed a distance apart equal to the distance the chain will travel during the one and one half revolutions of shaft 72 caused by the "Geneva movement" shown. The upper run of the chain 89 rests on a plate 103 forming part of the frame 92.

As the paper is fed forward by means of the rollers 36—43 and rollers 82—83, it passes above the upper run of the chain, and when enough paper has passed between the scissor blades to form a wrapper the movable blade 60 is actuated, thereby cutting the paper, and the wrapper portion then between the rollers 82—83 is moved forward at a greater speed than the paper between the rollers 36—43, whereby a gap is formed between the wrapper 104 and the paper. As the wrapper is moved forward by the rollers 82—83 the forward end of the wrapper engages guides 105 which serve to move the wrapper down onto the chain moving at the same speed; and an arm of said chain then enters the gap behind the wrapper and moves the wrapper further forward. Near the end of this movement of the chain the paper that is fed by rollers 36—43 will move forward between the rollers 82—83, and at the end of movement of the chain the scissors will cut off another wrapper ready to be moved forward by another forward movement of the chain. The different parts of the machine then stand in the position shown by Figs. 1, 2, 4, 5, 6, 7, 8, 9, 10, 11 and 15.

Secured to the continuously revolving shaft 15 is a sprocket wheel 106 over which rides an endless chain 107 riding over a sprocket wheel 108 which is secured to a shaft 109. Secured to shaft 109 is a gear wheel 110 in mesh with a gear wheel 111 which is secured to a shaft 112 having a segment 113 attached thereto. Also in mesh with gear wheel 110 is a gear wheel 114 which is secured to a shaft 115 having a roller 116 secured thereto. Resting upon the segment 113 and a support 117 forming part of a receptacle 118, is a pile of coupon wrappers 119. Revolution of shaft 112 causes the segments to move the lowermost coupon forward between a gauge 120 and the roller 116, the latter then serving to move the coupon further forward.

Secured to shaft 115 is a large gear wheel 121 in mesh with a small gear wheel 122 which is secured to a shaft 123 to which a gear wheel 124 and a roller 125 are secured. Gear wheel 124 is in mesh with a small gear wheel 126 secured to a shaft 127 having a small roller 128 secured thereto, which shaft is journaled in a swinging arm 129 pivoted on a fixed shaft 130. A spring 131 attached to the fixed shaft 130 and engaging the arm 129 causes the small roller 128 to press the coupon that is fed forward by roller 116 up against the roller 125, whereby the coupon is moved further forward and at a greater speed owing to the fact that the shaft 123 actuating the rollers is driven faster by means of the gear wheels 121 and 122.

The coupon wrapper as it leaves the rollers 125 and 128 passes between guides 132 and 133 formed on a conveyor 134 adapted to slide on rods 135 extending transversely to the line of travel of the coupon. Pivoted on the conveyor 134 is a link 136 which is pivoted on the free end of an arm 137 secured to a rock-shaft 138. Rock-shaft 138 extends longitudinally of the machine, and is provided with a short arm 139 having a roller 140 in engagement with a cam groove 141 formed in a barrel 142 which is secured to the continuously revolving shaft 10. By reference to Figs. 2, 7 and 10, it will be seen that with the shaft 10 revolving in the direction indicated by the arrow, cam groove 141 acting on roller 140, arm 139, shaft 138, arm 137 and link 136, has caused the conveyor 134 to be moved to the position for receiving the coupon. After a half revolution of shaft 10, cam groove 141 will cause the conveyor to be moved transversely on rods 135 until the coupon wrapper is moved to a position in advance of the arm 102 of chain 89 that has moved the inner wrapper 104 forward from between rollers 82—83, as shown in Fig. 3.

During the next intermittent movement of chain 89 which will cause a second arm to move a second inner wrapper forward from between the rollers 82—83, the first named arm will move the first named wrapper forward, together with the coupon wrapper which will be moved out of the conveyor and forward between two lateral guides 143 which permit the coupon wrapper to come to rest on the upper side of the inner wrapper. The under side of lateral guides 143 are shaped to cause the inner wrapper to be forced down toward the chain 89. The conveyor will then return to the position for receiving a second coupon wrapper, and following that will move said second coupon wrapper to position in advance of said second arm having said second inner wrapper in advance thereof.

During another intermittent movement of chain 89 which will cause a third arm to move a third inner wrapper forward from between the rollers 82—83, the first named arm will move the first named wrapper and coupon wrapper forward beneath a guide 144. The conveyor will then return to the position for receiving a third coupon wrapper.

Secured to the shaft 115 is a sprocket wheel 145 over which rides an endless chain 146 riding over a sprocket wheel 147 which is secured to a shaft 148. Slack in the chain 146 may be taken up by means of an idle pulley 149 journaled on a swinging arm 150 which is fastened to a fixed shaft 151 by means of a screw 152. Secured to shaft 148 are rollers 153 and a gear wheel 154 which is in mesh with an intermediate gear wheel 155 in mesh with a gear wheel 156 secured to a shaft 157 having segments 158 secured thereto. Resting upon the segments 158 and a support 159 forming part of a receptacle 160 is a pile of outer wrappers 161 which are wider and longer than the coupon wrapper. Revolution of shaft 157 causes the segments to move the lowermost wrapper forward free from a needle 162 serving to prevent removal of wrappers from the pile other than the lowermost one. The wrapper that is moved forward by means of the segments is moved onto the rollers 153 which cause the wrapper to be moved further forward. Secured to shaft 148 is a large gear wheel 163 in mesh with a small gear wheel 164 which is secured to a shaft 165 to which a gear wheel 166 and rollers 167 are secured. Gear wheel 166 is in mesh with a small gear wheel 167 secured to a shaft 168 having small rollers 169 secured thereto, which shaft is journaled in a swinging arm 170 pivoted on a fixed shaft 171. A spring 172 attached to the fixed shaft 171 and engaging the arm 170 causes the small rollers 169 to press the outer wrapper that is fed forward by rollers 153 up against the rollers 167, whereby the outer wrapper is moved further forward and at a greater speed.

The outer wrapper as it leaves the rollers 167—169 passes between guides 173 and 174 formed on a conveyor 175 adapted to slide on rods 176 extending transversely to the line of travel of the outer wrapper. The conveyor 175 is connected by a link 177 to the free end of an arm 178 which is secured to the rock-shaft 138.

When movement of the rock-shaft 138 causes the conveyor 134 to move the third coupon wrapper previously referred to into position in advance of said third arm having said third inner wrapper in advance thereof, said movement of the rock-shaft also causes the conveyor 175 to be moved transversely on rods 176 until the outer wrapper 161 is moved to a position in advance of the first named arm having said inner and coupon wrappers in advance thereof, as shown in Fig. 3.

During another intermittent movement of chain 89 which will cause a fourth arm to move a fourth inner wrapper forward from between the rollers 82—32, the first named arm will move the first named inner wrapper, and coupon wrapper, and outer wrapper forward to rest on supports 179, as shown in Fig. 23.

When the wrappers are moved forward on the supports 179, the greater length of the outer wrapper causes the forward end thereof to protrude beyond the other wrappers, which protruding end passes beneath a spring 180 which presses the under side of said end down onto a roller 181. Roller 181 is secured to a shaft 182 to which a gear wheel 183 is secured. In mesh with gear wheel 183 is a gear wheel 184 which is secured to a shaft 185 having a roller 186 secured thereto, which roller revolves in a receptacle 187 and carries paste 188 therefrom to roller 181 which in turn applies the paste to said under side of said protruding end of the outer wrapper. Shaft 185 rotates in bearings formed on the paste receptacle 187 and is connected by means of a universal joint 189 to a shaft 190 which is connected by a universal joint 191 to a shaft 192 which rotates in a bearing formed on frame 1. Secured to shaft 192 is a sprocket wheel 193 which is driven by means of an endless chain 194 riding over a sprocket wheel 195 secured to a shaft 196 and over a sprocket wheel 197 secured to the continuously revolving shaft 10. The chain 194 is held in engagement with the sprocket wheel 193 by means of an idle pulley 198.

Simultaneous with the movement of the wrappers onto the supports 179 by means of the arms 102 of the intermittently moving chain 89, a cake of soap 199 which has been manually placed in one of a series of supporting frames 200 secured to an endless chain 201, has been moved transversely to the line of travel of said chain 89, by an intermittent movement of the chain 201, so that said cake of soap rests below the center of the wrappers. The weight of the supporting frames 200 together with the soap 199 is sustained by a table 202, while the chain 201 travels edgeways vertically over sprocket wheels 203, 204, 205 and 206, slack in the chain being taken up by means of a curved guide 207 placed between the sprocket wheels 206 and 203, and engaging a part 208 of each of said supporting frames 200, whereby the chain is moved away from a straight line of draft from wheel 206 to 203, thereby causing a frame 200 to move the soap 199 to rest beneath the center of the wrappers.

Secured to sprocket wheel 206 is a vertical shaft 209 free to rotate in a bearing 210 and having a bevel gear wheel 211 secured to the lower end thereof. In mesh with bevel gear wheel 211 is a bevel gear wheel 212 secured to a shaft 213, extending longitudinally along the front side of the machine and provided with a bevel gear wheel 214 in mesh with a bevel gear wheel 215 secured to the shaft 29. It will be understood that intermittent rotations of shaft 29 will, by means of the mechanism just described cause intermittent movements of the chain 201, and that by means of gear wheel 70 secured to said shaft, the mechanism causing intermittent movements of chain 89 will be actuated simultaneous therewith.

The portion of table 202 that is beneath the supporting frame 200 below the wrappers is provided with an opening 216, and each of the supporting frames is provided with an opening 217. Beneath the wrappers and soap shown in Fig. 23 is a plunger 218 adapted to move vertically in guides 219. Connected to plunger 218 is a link 220 connected to the free end of a swinging arm 221 which is pivoted on a fixed shaft 222. Arm 221 is connected by a link 223 to an arm 224 which is pivoted on a fixed shaft 225. The free end of arm 224 is provided with a roller 226 which travels in a cam groove 227 formed in a disc 228 which is secured to shaft 10. The portion of cam groove 227 near the periphery of the disc 228 causes the plunger 218 to occupy said position below the soap and the wrappers shown in Fig. 23. Above the wrappers shown in Fig. 23, and in line with the plunger 218 is a slide 229 adapted to move vertically in guides 230. Slide 229 is connected by a link 231 to the free end of a swinging arm 232 which is secured to a rock-shaft 233 to which a short arm 234 is secured. Arm 234 is connected by a link 235 to a swinging arm 236 which is pivoted on the fixed shaft 222. The free end of arm 236 is provided with a roller 237 which travels on a cam surface 238 formed on the gear wheel 9. The portion of cam surface 238 near the periphery of gear wheel 9 causes the slide 229 to occupy the position shown in Fig. 23. As shaft 10 rotates, the portion of cam surface 238 extending from near the periphery to near the center of the gear wheel 9 causes the slide 229 to move down from the position shown in Fig. 23 to a position just above the wrappers, as shown in Fig. 12. At the same time the barrel cam 142 has caused the rock-shaft 138 to move the conveyors 134 and 175 to the position for receiving other wrappers from the mechanism feeding wrappers thereto, and cam groove 227 extending from near the periphery of disc 228 toward the center thereof has caused plunger 218 to be moved up through the opening 216 in the table 202, and the opening 217 in the frame 200 supporting the cake of soap, and has moved the soap up against the under side of the wrappers. As rotation of shaft 10 continues said portion of cam groove 227 causes continued upward movement of plunger 218 thereby raising the soap and wrapper up against the slide 229, and the portion of cam surface 238 extending from the center of gear wheel 9 toward the periphery causes the slide 229, while retaining the wrapper in place on the soap, to move up in unison with the plunger 218 which then forces the soap and wrappers between two straight edge plates 239 attached to a bracket 240 secured to the frame 1. The plates 239 cause the portion of the wrapper overhanging the sides of the soap to be folded down against the sides of the soap, and as the upward movement of the soap and wrappers is continued, the portion of the wrapper overhanging the ends of the soap is forced between two curved plates 241 forming part of slides 242 which are attached to the bracket 240. The curved plates 241 cause the portion of the wrapper overhanging the ends of the soap to be folded against the upper edge of the rounded ends thereof, and jointly with said straight plates 239 cause a surplus of wrapper to overhang the ends of the soap. The outer ends of each curved plate stand removed from said straight plate, whereby the wrapper is folded against a part of the rounded ends that is midway between the center of the sides and the center of the ends of the soap, thereby starting to produce side end flaps, as shown in Fig. 13. Midway between the two ends of each curved plate is a slot 243 which extends parallel with the longitudinal axis of the plunger 218 said slot joining a slot 244 in said curved plate that is inclined toward one of said straight plates 239. As upward movement of the soap and wrappers is continued, said surplus of wrapper overhanging the ends of the soap will be folded down against the rounded ends thereof, thereby causing formation of the side end flaps (a) and (b), and causing said surplus of wrapper to enter the slot 243, as shown in Fig. 14. At the same time the side end flaps (a) are just short of being acted on by swinging folders 245 which are secured to a rock-shaft 246 journaled in the bracket 240. To one end of rock-shaft 246 is secured an arm 247 connected to a spring 248 which is connected to an arm 249, secured to a rock-shaft 250 journaled in the bracket 240, and having swinging folders 251 secured thereto. Secured to rock-shaft 250 is an arm 252 and secured to rock-shaft 246 is an arm 253. Spring 248 causes the arms 252 and 253 to bear against the end surface 254 and 255 of a lug 256 secured to a swinging arm 257, which in the position shown in Fig. 14, cause the swinging folders to be held out of action. Swinging arm 257 is pivoted on a short shaft 258 and pivoted to said arm is a bar 259 having a forked end 260 which straddles the shaft 10. Mounted on the bar 259 is a roller 261 which is held against a cam 262 by means of a spring 263 connected to the swinging arm 257 and the frame 1.

During movement of the soap and wrappers from the position shown in Fig. 14 to the position shown in Fig. 15, the surplus of wrapper travels up in slot 243 and is thereby folded into an end flap (c). At the same time the roller 261, by travel on the surface 264 of the cam 262, causes downward movement of swinging arm 257 and the attached lug 256, and the limited length of end surface 255 thereof permits the arm 253 to be moved inward above the lug by action of the spring 248 on the rock-shaft 246, thereby causing the swinging folders 245 to start folding the side end flap (a). As shown in Fig. 16, further upward movement of the soap and wrappers causes said end flap (c) to be forced into said inclined slots 244 and thereby be folded toward one of said straight plates 239. At the same time, further downward movement of swinging arm 256 causes further movement of the swinging folders 245 and consequent further folding of the side end flap (a).

During further upward movement of the plunger 218, simultaneous with further downward movement of arm 257 the side end flap (a) will be further folded by means of swinging folder 245, and the side end flap (*b*) will be folded, because the surface 254 of lug 256 permits the arm 252 to be moved in above the lug by action of the spring 248 on rock-shaft 250 and the attached folders 251. At the end of upward movement of plunger 218 and downward movement of swinging arm 257, the side end flaps (*a*) and (*b*) will be completely folded by the swinging folders 245 and 246 which are stopped from further movement by stop 265 which check the action of spring 248 on rock-shafts 246 and 250; see Fig. 17. During the upward movement of the soap and wrappers to the position shown in Fig. 17, they are forced against inclines 266, see Fig. 18, which are formed on curved surfaces 267 formed on laterally swinging arms 268, which arms are held against the rounded ends of the wrapper covered soap by means of a spring 269. In order that the wrapped soap may be supported during downward movement of the plunger 218 from the position shown in Fig. 18 to the position shown in Fig. 19, horizontally reciprocating folders 270 are moved a short distance beneath the ends of the wrapped soap. Folders 270 are secured to slides 271 moving in guides 272 which are formed on standards 273 secured to the frame 1. In engagement with a pin 274 forming part of each slide 271 is the slotted end 275 of a swinging arm 276 which is secured to a rock-shaft 277, journaled in each standard 273. Secured to each shaft 277 is an arm 278 provided with a gear segment 279 in mesh one with the other. Secured to one of the shafts 277 is an arm 280 the free end of which is provided with a hole in which is fitted the upper end of a screw threaded rod 281 having a nut 282 on which the arm 280 bears.

The lower end of rod 281 is connected to a swinging arm 283 which is pivoted on the fixed shaft 222. The free end of swinging arm 283 is provided with a roller 284, which by action of a spring 285 connecting arm 280 to frame 1, as shown in Fig. 11 is caused to travel on a cam surface 286 formed on a cam 287 secured to shaft 10. When the roller 284 travels from the cam surface 286 to the cam surface 288 on cam 287, action of spring 285 on arm 280 causes movement of one of the rock-shafts 277, arm 278, and gear segment 279 which acting on the gear segment 279 of the other arm 278, causes movement of the other rock-shaft 277. Movement of the rock-shafts 277 cause movement of the swinging arms 276 which cause movement of the folders 270 from the position shown in Figs. 10 and 17 to the position shown in Fig. 18. At the same time cam 262 will have caused upward movement of swinging arm 257, thereby causing the lug 256 to actuate the arms 252 and 253 and cause the rock-shafts 246 and 250 connected thereto to move the swinging folders 245 and 251 to the position shown in Figs. 18 and 19. When the roller 284 travels from the cam surface 288 to the cam surface 289, on cam 287, action of spring 285 causes movement of the rock-shafts 277, which cause movement of the folders 270 from the position shown in Fig. 18 to the position shown in Fig. 19, thereby causing the folded end flaps (*c*) and folded side end flaps (*a*) and (*b*) to be folded beneath the soap. The folders 270 have a width approximately the same as the soap, whereby folds formed in the wrapper and resulting in the formation of side flaps (*d*) and (*e*), as shown in Fig. 19, are farther apart than the folds that are formed by the joint action of straight folders 239 and curved end folders 241, which cause the wrapper to be folded against a part of the rounded ends of the soap that is midway between the center of the sides and the center of the ends of the soap, and resulting in the formation of side end flaps that are not so far apart as the total width of the soap. When the roller 284 travels from the cam surface 289 to the cam surface 286 on cam 287, the connections to arm 280 cause movement of the rock-shafts 277, which cause movement of the folders 270 from the position shown in Fig. 19 to the position shown in Fig. 20. At the same time, the barrel cam 142 causes movement of the rock-shaft 138, which causes transverse movement of the conveyors 134 and 175, so that the wrappers therein will be in position to be moved forward by arms 102 of the intermittently moving chain 89. Also at the same time, cam 227 causes the plunger 218 to be moved to its lowermost position.

During these movements, a folder 290 having horizontal reciprocating movement at right angles to the movements of folders 270, causes the side end flap (*d*) to be folded beneath the flaps that have been folded by folders 270, the soap and wrappers being held in place during movement of the folder by means of the curved surface 267 formed on the grippers 268. Folder 290 is secured to an arm 291 secured to a slide 292 having reciprocating movement in guides formed on the frame 1. Secured to slide 292 is an arm 293 extending downward and provided with a vertical slot 294 joining a curved slot 295. As shown in Fig. 1 the slot 294 is in engagement with a roller 296 journaled on an upwardly extending arm 297 forming part of a frame 298, which frame is provided with a shaft 299 at each end thereof having rocking movement in bearings formed on the frame 1. Secured to shaft 299 is an arm 300 which is connected by a link 301 to one end of a lever 302 which is pivoted on a fixed shaft 303. The other end of lever 302 is provided with a roller 304 which travels in a cam groove 305 formed on a disc 306. When the roller 304 travels from the portion of cam groove 305 near the center to the portion near the periphery of the disc 306, movement of lever 302 causes movement of the rock-shaft 299 and the attached frame 298 and vertical arm 297 carrying the roller 296. Movement of the arm 297 causes the roller 296 in slot 294 of the arm 293 to move approximately horizontal thereby causing movement of the slide 292, arm 291, and folder 290 from the position shown in Figs. 1 and 11 until the folder 290 occupies the position shown in Fig. 20. The roller 296 will then travel downward in the curved slot 295 of the arm 293 which is then concentric with the circular path of roller 296 due to motion of rock-shaft 299, whereby no further movement will be imparted to the slide 292.

During this movement of rock-shaft 299 and frame 298 forming part thereof, a roller 307 journaled on an arm 308 forming part of frame 298 and placed at right angle to the arm 297, travels in a curved slot 309 joining an upwardly extending slot 310 that is formed on a vertical arm 311 which is secured to a slide 312 having reciprocating movement in guides formed on the frame 1. Forming part of arm 311 is an arm 313 that extends horizontally across to and has movement on the slide 292, and forming part of arm 293 is an arm 314 that extends horizontally across to and has movement on slide 312. Secured to slide 312 is an arm 315 to which is secured a plunger 316 that is placed above the folder 290, and between the grippers 268, and in range with the partially wrapped soap. Secured to plunger 316 is a plate 317 provided with inclined surfaces 318 extending from the forward end of the plate to the back end which is wider.

It will be seen that while roller 307 travels upward in curved slot 309 during the first part of said movement of the rock-shaft 299, no movement will be imparted to slide 312, while during the last part of said movement of the rock-shaft in which no further movement will be imparted to the slide 292, movement of roller 307 approximately horizontal in slot 310 of the arm 311 will cause forward movement of the slide 312, arm 315, plunger 316 and plate 317, whereby the inclines 318 of plate 317 will be forced against rollers 319 which are journaled in the grippers 268, thereby spreading the grippers apart against the force of springs 269. The partially wrapped soap is thereby freed from the curved surfaces 267 of the grippers and forced forward by plunger 316, which causes flap (e) to be forced against the edge 320 of a supporting plate 321, thereby causing the flap (e) with the paste 188 thereon to be folded up against the folded flap (d) when the completely wrapped soap has been moved onto the supporting plate 321, as shown in Fig. 21.

The ends of the grippers opposite the ends carrying the rollers 319 are farther apart and are attached to springs 322 secured to standards 273, whereby the wrapped soap can be moved forward without undue friction against the grippers.

When the roller 304 travels from the portion of cam 305 near the periphery to the portion near the center of disc 306, movement of lever 302 causes movement of the rock-shaft 299 in the reverse direction, resulting first in return movement of slide 312, followed by return movement of the slide 292. The folder 290 and the plunger 316 with the attached plate 317 will then occupy the position shown in Fig. 23. The rollers 319 will then bear against the forward end of the plate 317 which serves to limit the inward movement of the grippers 268 caused by spring 269.

While the wrapper retaining slide 229 is moved downward from the position shown in Fig. 23 to the position shown in Fig. 12, one of a series of arms 323 formed on each of a pair of endless chains 324 riding over sprocket wheels 325 which are secured to the continuously revolving shaft 196, and riding over sprocket wheels 326 secured to a shaft 327 which is journaled in bearings on the outer end of the supporting plate 321, causes the completely wrapped soap to be moved along on the supporting plate and beneath the lower runs of said endless chains.

Resting on the lower run of the endless chains 324, are a series of rollers 328 which are provided with shafts 329 having vertical movement in slots 330 formed on uprights 331 which are secured to the supporting plate 321. The weight of the rollers 328 causes the lower runs of the chains 324 to be pressed down onto the wrapped cakes of soap as they are moved along on the supporting plate 321 by means of the arms 323, thereby causing the paste coated flap (e) to be held firmly against the flap (d), during their travel on table 321, which is made long enough to allow time for the paste to dry.

Having described our invention, what we claim is:

1. In apparatus of the character described, in combination, means adapted to receive and hold an article and a wrapper therefor, folding means adapted to fold said wrapper downwardly on the two opposite sides of said article to form side flaps, folding means adapted to fold said wrapper downwardly on the two opposite ends of said article to form two end flaps, folding means adapted to move inwardly and about the ends of said article to fold the end portions of said side flaps inwardly against the ends of the article, means adapted to fold the lower portion of said last folded portions together with the lower portions of said end flaps inwardly and upwardly against the bottom of said article, and means adapted to fold the lower portions of said side flaps inwardly and upwardly against the bottom of the article to complete the wrapping operation.

2. In apparatus of the character described, in combination, means adapted to receive and hold an article having substantially irregularly shaped ends and a wrapper therefor, folding mechanism for forming side flaps in said wrapper thereby to commence the wrapper-folding operation, an end folder adjacent said folding means and shaped to correspond substantially to said irregularly shaped end of said article, means for causing relative movement between said article and wrapper holding means and said end folder to take place, said end folder having a substantially centrally positioned slot extending in the direction of said relative movement, said end folder being effective upon said relative movement taking place to form side end flaps in said wrapper and said slot being effective to receive the surplus wrapper due to the formation of said side end flaps and to form said surplus into a middle end flap, means for folding said middle end flap against said irregularly shaped end of said article, and mechanism for folding said side end flaps and said side flaps inwardly upon said article to complete the wrapping operation.

3. In apparatus of the character described, in combination, means adapted to receive and hold an article having iregularly shaped ends and a wrapper therefor, folding mechanism adapted to fold said wrapper downwardly on two opposite sides of said article, a pair of oppositely positioned folders adjacent said folding means, each of said folders being shaped to correspond substantially to the irregularly shaped ends of said article, means for causing relative movement to take place between said oppositely positioned folders and said holding means, each of said folders having a slot extending throughout a portion of its length substantially in the direction of said relative movement and extending throughout the remainder of its extent at an angle to said direction of relative movement, said oppositely positioned folders being effective upon said relative movement taking place to fold said wrapper downwardly about said irregularly shaped ends of said article and said first-mentioned portion of said slot being effective to form a middle end flap out of the surplus wrapper due to said irregularly shaped ends of said article and said inclined portion of said slot being effective upon continued relative movement to fold said middle end flap over and against said irregularly shaped end of said article, and means for folding said downwardly folded wrapper inwardly upon said article to complete the wrapping operation thereof.

4. In apparatus of the character described, in combination, a movable plunger, means for positioning an article having substantially irregularly shaped ends adjacent said plunger, means for interposing a wrapper between said article and said plunger, means cooperating with said plunger to grip and hold said wrapper and said article, means for folding said wrapper on opposite sides downwardly against the sides of said article, a pair of stationary end folders each shaped substantially to correspond to the irregularly shaped ends of said article and each positioned substantially in the line of movement of said movable plunger, each of said stationary end folders having a slot extending substantially in the direction of travel of said plunger with its associated article and wrapper, means for moving said plunger with its associated article and wrapper past said stationary end folders, each of said end folders being thus operative to fold the ends of said wrapper downwardly over said irregularly shaped ends of said article, and the slot in each of said end folders being effective to receive and to form the surplus wrapper due to irregularly shaped ends of said article into a middle end flap, means for folding each of said middle end flaps against the irregularly shaped end of said article, and means for folding said downwardly folded wrapper inwardly upon said article to complete the wrapping operation thereof.

5. In apparatus of the character described, in combination, a movable plunger, means for positioning an article having substantially irregularly shaped ends adjacent said plunger, means for interposing a wrapper between said article and said plunger, means cooperating with said plunger to grip and hold said wrapper and said article, means for folding said wrapper on opposite sides downwardly against the sides of said article, a pair of stationary end folders each shaped substantially to correspond to the irregularly shaped ends of said article and each positioned substantially in the line of movement of said movable plunger, each of said stationary end folders having a slot extending substantially in the direction of travel of said plunger with its associated article and wrapper and having an extended portion of said slot directed at an angle to the line of travel of said plunger, means for moving said plunger with its associated article and wrapper past said stationary end folders, said end folders being effective to fold the ends of said wrapper downwardly over said irregularly shaped ends of said article, and said first portion of said slot being adapted to receive and to form the surplus wrapper due to said irregularly shaped ends into a middle end flap, and said extended inclined portion of said slot being effective to fold said middle end flap laterally against said irregularly shaped end as said plunger moves said article and wrapper past said stationary end folders, and means for folding said downwardly folded wrapper inwardly upon said article to complete the wrapping operation thereof.

6. In apparatus of the character described, in combination, a movable plunger, means adapted to hold a wrapper and an article against said plunger with the wrapper interposed between said plunger and said article, means for folding said wrapper downwardly over the sides and ends of said article, said means being operative upon said wrapper while said wrapper and article are held against said plunger by said holding means, means for moving said plunger with its associated wrapper and article in an upward direction and out of operative relation with said folding means, means for gripping said article and folded wrapper at substantially the side portions of said article, means for withdrawing said holding means after said article and wrapper has been gripped by said gripping means, folding mechanisms operative upon said downwardly folded portions of said wrapper while said wrapper and article are held by said gripping means and adapted to fold said portions of said wrapper inwardly against the portions of said article from which said holding means has been withdrawn, thereby to complete the wrapper folding operations, and means for discharging said wrapped article from said gripping means.

7. In apparatus of the character described, in combination, a movable plunger, means adapted to hold an article having irregularly shaped ends against said plunger and with a wrapper interposed between said plunger and said article, folding mechanisms operative upon said wrapper while said wrapper and article are held by said holding means against said plunger to fold said wrapper downwardly over the sides and irregularly shaped ends of said article, gripping means having portions shaped to correspond substantially to the irregularly shaped ends of said article and adapted to grip said article at said irregularly shaped ends, means for moving said plunger with its associated article and downwardly folded wrapper into said gripping means to be gripped and held thereby, means for withdrawing said holding means cooperating with said plunger, folding mechanisms adapted to fold said downwardly folded wrapper inwardly against said article while said article and wrapper are held by said gripping means thereby to complete the wrapping operation, and means for separating said irregularly shaped gripping means to permit the discharge of said wrapped article therefrom.

8. In apparatus of the character described, in combination, means adapted to receive and hold an article and a wrapper therefor, folding means adapted to fold said wrapper downwardly on the two opposite sides of said article to form side flaps, folding means adapted to fold said wrapper downwardly on the two opposite ends of said article to form two end flaps, folding means comprising swinging members adapted to move inwardly and about the ends of said article to fold the end portions of said side flaps inwardly against the ends of the article, means adapted to fold the lower portion of said last folded portions together with the lower portions of said end flaps inwardly and upwardly against the bottom of said article, and means adapted to fold the lower portions of said side flaps inwardly and upwardly against the bottom of the article to complete the wrapping operation.

9. A wrapping machine comprising a receiving channel provided with a moving chain having a series of arms; wrapper folding devices and means whereby an article may be moved to rest in range therewith; means whereby a wrapper may be moved to rest between said folding devices and said article; means whereby said article and wrapper are moved into engagement with said folding devices whereby the wrapper is partially folded upon the article; in combination with a transversely reciprocating plunger adapted to move said article and wrapper into said receiving channel, thereby causing a flap of the wrapper to take against a part of the channel, whereby said flap is folded against said folded portions of the wrapper; said plunger also causing the wrapped article to be moved into position for engagement by one of the arms of said chain, whereby the wrapped article is moved along said receiving channel.

10. A wrapping machine comprising a receiving channel, wrapper folding devices, a vertically reciprocating plunger, a paste applying device; means whereby a wrapper may be moved to rest between said folding devices and said plunger and into engagement with said paste applying devices; means whereby an article may be moved to rest between said wrapper and said plunger; means whereby upward movement of said plunger forces said article and wrapper into engagement with said folding devices, whereby the wrapper is partially folded upon the article; mechanism causing end flaps to be folded beneath the article, and causing a side flap to be folded beneath said folded flaps; in combination with a transversely reciprocating plunger adapted to move said article and wrapper into said receiving channel thereby causing the remaining side flap having said paste thereon to take against a part of the channel, whereby said paste coated flap is folded up against the other folded side flap.

11. In apparatus of the character described, in combination, a movable plunger, means adapted to hold a wrapper and an article having irregularly shaped ends against said plunger and with the wrapper interposed between said plunger and said article, folding mechanism adapted to fold said wrapper downwardly over the sides and ends of said article while said article and wrapper are associated with said plunger and said holding means, resilient gripping means having irregularly shaped portions corresponding substantially to the irregularly shaped ends of said articles and having said portions beveled to permit said article to be thrust into said gripping means, means for moving said plunger with its holding means and associated wrapper and article into said resilient gripping means, said irregularly shaped portions thereof engaging and holding said wrapper and article at the irregularly shaped ends of the latter, means for withdrawing said holding means cooperating with said plunger, folding mechanism operative after withdrawal of said holding means and while said article and wrapper are held by said resilient gripping means to fold said downwardly folded portions of said wrapper inwardly against said article to complete the wrapping operation, and means for discharging said wrapped article from said resilient gripping means.

12. In apparatus of the character described, in combination, a movable plunger, means adapted to hold a wrapper and an article having irregularly shaped ends against said plunger and with the wrapper interposed between said plunger and said article, folding mechanism adapted to fold said wrapper downwardly over the sides and ends of said article while said article and wrapper are associated with said plunger and said holding means, resilient gripping means having irregularly shaped portions corresponding substantially to the irregularly shaped ends of said articles and having said portions beveled to permit said article to be thrust into said gripping means, means for moving said plunger with its holding means and associated wrapper and article into said resilient gripping means, said irregularly shaped portions thereof engaging and holding said wrapper and article at the irregularly shaped ends of the latter, means for withdrawing said holding means cooperating with said plunger, folding mechanism operative after withdrawal of said holding means and while said article and wrapper are held by said resilient gripping means to fold said downwardly folded portions of said wrapper inwardly against said article to complete the wrapping operation, and a plunger adapted substantially simultaneously to release said resilient gripping means and to discharge said wrapped article therefrom.

13. In apparatus of the character described, in combination, a movable plunger, means associated with said plunger adapted to hold a wrapper and an article having irregularly shaped ends against said plunger and with the wrapper interposed between said plunger and said article, folding mechanism adapted to fold said wrapper downwardly over the sides and ends of said article, a receiving channel having a supporting base portion, resilient gripping means positioned adjacent said receiving channel and having irregularly shaped portions adapted to receive and grip the irregularly shaped ends of said article, means for moving said plunger and holding means to position said article with its partially folded wrapper in the grip of said gripping means, means for withdrawing said holding means cooperating with said plunger after said article and wrapper are gripped by said gripping means, a pair of folders adjacent said gripping means adapted to be moved inwardly with respect to said article and along substantially the plane of the bottom face of said article to fold the end portions of said wrapper inwardly and to form two oppositely disposed side flaps, means for folding the side flap opposite said receiving channel and its base portion inwardly against said article, means for withdrawing said last-mentioned pair of folders partially from said article, thereby to form a temporary support for said partially enwrapped article, and a plunger adapted substantially simultaneously to operate said resilient gripping means and to discharge said partially wrapped article from said gripping means into said receiving channel, said pair of partially withdrawn folders supporting said article during its discharging movement and the base portion of said receiving channel folding said other side flap during said discharging movement inwardly upon said other and opposite side flap and upon said article.

14. In apparatus of the character described, in combination, a movable plunger, means associated with said plunger adapted to hold a wrapper and an article having irregularly shaped ends against said plunger and with the wrapper interposed between said plunger and said article, folding mechanism adapted to fold said wrapper downwardly over the sides and ends of said article, a receiving channel having a supporting base portion, resilient gripping means positioned adjacent said receiving channel and having irregularly shaped portions adapted to receive and grip the irregularly shaped ends of said article, means for moving said plunger and holding means to position said article with its partially folded wrapper in the grip of said gripping means, means for withdrawing said holding means cooperating with said plunger after said article and wrapper are gripped by said gripping means, a pair of folders adjacent said gripping means adapted to be moved inwardly with respect to said article and along substantially the plane of the bottom face of said article to fold the end portions of said wrapper inwardly and to form two oppositely disposed side flaps, means for folding the side flap opposite said receiving channel and its base portion inwardly against said article, means for withdrawing said last-mentioned pair of folders partially from said article, thereby to form a temporary support for said partially enwrapped article, means for moving said partially wrapped article out of said gripping means and into said receiving channel, said pair of partially withdrawn folders acting to support said article during said movement and said base portion of said receiving channel acting to fold said remaining side flap against said other side flap and said article, and means operative to part said resilient gripping means to permit said last-mentioned means to move said article into said receiving channel.

15. In apparatus of the character described, in combination, a series of carrier frames each adapted to support an article, a movable plunger, means for intermittently moving said series of frames to position said frames and the articles carried thereby successively in substantial alignment with said plunger, means for moving and positioning a wrapper over a frame and its associated article moved into alignment with said plunger and between said article and said frame and said plunger, a second movable plunger adapted to be moved upwardly through said frame positioned in alignment with said first plunger to carry the article and its wrapper against said first plunger and out of said frame, folding devices adapted to fold said wrapper downwardly over the sides and ends of said article after said article and wrapper are moved away from said article carrier by said plungers, a gripping device adapted to receive and grip said article with said downwardly folded wrapper, means for withdrawing said second plunger from said article and through said carrier frame after said article and wrapper have been gripped by said gripping means, thereby to permit said series of carrier frames to be moved to position the next carrier and its article in operative relation to said plunger, folding mechanisms adapted to fold said downwardly folded wrapper inwardly against those portions of said article formerly engaged by said withdrawn plunger, and means for discharging said completely wrapped article from said gripping means.

16. In apparatus of the character described, in combination, a series of carrier frames each adapted to carry an article having irregularly shaped ends and shaped to correspond substantially to the shape of said article, a movable plunger, means for moving said series of carrier frames successively into operative relation to said plunger, means for moving and positioning a wrapper between an article in one of said carriers and said plunger, a second plunger adapted to be moved through said carrier frame to carry said article therein and said wrapper against said first plunger and out of said carrier, folding mechanism adapted to fold said wrapper downwardly over the sides and irregularly shaped ends of said article, a gripping device shaped to grip the irregularly shaped ends of said article, means for moving said plungers to move said article and downwardly folded wrapper into said gripping device to be gripped and held thereby, means for withdrawing said second plunger from said article after the latter is gripped by said gripping device and to withdraw said plunger also through said carrier frame to permit said series of frames to be moved to position the next succeeding carrier frame in operative relation to said plunger, folding mechanism operative upon said wrapper while said article is gripped by said gripping device to fold said wrapper inwardly against the portions of said device formerly engaged by said withdrawn plunger to complete the wrapping operation, and means for discharging said wrapped article from said gripping device.

17. In apparatus of the character described, in combination, means adapted to receive and hold an article having irregularly shaped ends and a wrapper therefor, folding means adapted to fold said wrapper downwardly on the two opposite sides of said article to form side flaps, a pair of plate members shaped substantially to correspond to said irregularly shaped ends of said article and adapted upon relative movement between the same and said article with its wrapper to fold said wrapper downwardly on said ends to form end flaps, means adapted thereupon to fold the end portions of said side flaps inwardly against said irregularly shaped ends of said article and over said end flaps, means adapted to fold the lower portions of said last folded portions together with the lower portions of said end flaps inwardly and upwardly against the bottom of said article, and means adapted to fold the lower portions of said side flaps inwardly and upwardly against the bottom of said article to complete the wrapping operation.

18. In apparatus of the character described, in combination, means adapted to receive and hold an article having an irregularly shaped end and a wrapper therefor, folding means adapted to fold said wrapper downwardly on two opposite sides of said article to form side flaps, end folding means adapted to form two side end flaps and to fold the surplus wrapper due to said irregularly shaped end and intermediate of said two side end flaps into an intermediate end flap, and means for folding said flaps inwardly against said article to complete the wrapping operation.

19. In apparatus of the character described, in combination, means adapted to receive and hold an article having an irregularly shaped end and a wrapper therefor, folding means adapted to fold said wrapper downwardly on two opposite sides of said article to form side flaps, a plate member shaped substantially to correspond to said irregularly shaped end of said article and adapted upon relative movement therebetween and said article with its applied wrapper to form two side end flaps, means associated with said plate member for receiving surplus wrapper intermediate of said side end flaps and adapted to form an intermediate end flap, and means for folding said flaps inwardly against said article to complete the wrapping operation.

20. In apparatus of the character described, in combination, means adapted to receive and hold an article having an irregularly shaped end and a wrapper therefor, folding means adapted to fold said wrapper downwardly on two opposite sides of said article to form side flaps, a plate member shaped substantially to correspond to said irregularly shaped end of said article and adapted upon relative movement therebetween and said article with its applied wrapper to form two side end flaps, means associated with said plate member for receiving surplus wrapper intermediate of said side end flaps and adapted to form an intermediate end flap, and means for folding successively said intermediate end flap, said side end flaps, and said side flaps inwardly against said article.

21. In apparatus of the character described, in combination, means adapted to receive and hold an article having an irregularly shaped end and a wrapper therefor, folding means adapted to fold said wrapper downwardly on two opposite sides of said article to form side flaps, a plate member shaped substantially to correspond to said irregularly shaped end of said article and adapted upon relative movement therebetween and said article with its applied wrapper to form two side end flaps, means associated with said plate member for receiving surplus wrapper intermediate of said side end flaps and adapted to form an intermediate end flap, means effective upon said relative movement being continued to fold said intermediate end flap against said article, and means effective upon further continuation of said relative movement to fold said side end flaps inwardly against said article.

22. In apparatus of the character described, in combination, means adapted to receive and hold an article having an irregularly shaped end and a wrapper therefor, folding means adapted to fold said wrapper downwardly on two opposite sides of said article to form side flaps, a plate member shaped substantially to correspond to said irregularly shaped end of said article and adapted upon relative movement therebetween and said article with its applied wrapper to form two side end flaps, means associated with said plate member for receiving surplus wrapper intermediate of said side end flaps and adapted to form an intermediate end flap, means effective upon said relative movement being continued to fold said intermediate end flap against said article, a pair of oppositely positioned side end flap folders, and means effective upon substantial completion of the folding of said intermediate end flap against said article to actuate said oppositely positioned folders to fold said side end flaps against said article.

23. In apparatus of the character described, in combination, means adapted to receive and hold an article having an irregularly shaped end and a wrapper therefor, folding means adapted to fold said wrapper downwardly on two opposite sides of said article to form side flaps, a plate member shaped substantially to correspond to said irregularly shaped end of said article and adapted upon relative movement therebetween and said article with its applied wrapper to form two side end flaps, means associated with said plate member for receiving surplus wrapper intermediate of said side end flaps and adapted to form an intermediate end flap, means effective upon said relative movement being continued to fold said intermediate end flap against said article, a pair of oppositely positioned side end flap folders, and means effective upon further continuation of said relative movement to operate said pair of folders to fold said side end flaps against said article.

24. In apparatus of the character described, in combination, means adapted to receive and hold an article and a wrapper therefor, means for folding said wrapper downwardly on opposite sides of said article to form side flaps, means for folding said wrapper downwardly on opposite ends of said article, a pair of oppositely disposed folders adapted to be moved inwardly along substantially the plane of the bottom of said article to fold the downwardly folded end portions of said wrapper inwardly against the bottom of said article and to leave substantially said first mentioned side flaps, means for partially withdrawing said last-mentioned folders to form a temporary support for said partially wrapped article, means for withdrawing said article and wrapper holding means upon the partial withdrawal of said folders, and means for thereupon folding against said article said two side flaps.

25. In apparatus of the character described, in combination, a movable plunger, means adapted to hold a wrapper and an article against said plunger with the wrapper interposed between said plunger and said article, means for folding said wrapper downwardly over the sides and ends of said article, said means being operative upon said wrapper while said wrapper and article are held against said plunger by said holding means, means for moving said plunger with its associated wrapper and article in an upward direction and out of operative operation with said folding means, a pair of oppositely disposed folders adapted to be moved inwardly along substantially the plane of the bottom of the article to fold the downwardly folded end portions of said wrapper inwardly against the bottom of the article and to leave substantially said first mentioned side flaps, means for partially withdrawing said last mentioned folders to form a temporary support for said partially wrapped article, means for withdrawing said plunger upon the partial withdrawal of said folders, and means for thereupon folding said side flaps inwardly against said article.

26. In apparatus of the character described, in combination, a movable plunger, means adapted to hold a wrapper and an article against said plunger with the wrapper interposed between said plunger and said article, means for folding said wrapper downwardly over the sides and ends of said article, said means being operative upon said wrapper while said wrapper and article are held against said plunger by said holding means, means for moving said plunger with its associated wrapper and article in an upward direction and out of operative operation with said folding means, a pair of oppositely disposed folders adapted to be moved inwardly along substantially the plane of the bottom of the article to fold the downwardly folded end portions of said wrapper inwardly against the bottom of the article and to leave substantially said first mentioned side flaps, means for partially withdrawing said last mentioned folders to form a temporary support for said partially wrapped article, means for withdrawing said plunger upon the partial withdrawal of said folders, a receiving channel having a base portion in substantial alignment with said partially withdrawn folders, means for folding the side flap opposite the base portion of said receiving channel inwardly against said article, and means for moving said article with its remaining depending side flap across said partially withdrawn folders and into said receiving channel, the base portion of said receiving channel folding said remaining side flap inwardly upon said other and opposite side flap and upon said article during the movement of said article into said receiving channel.

27. In apparatus of the character described, in combination, a series of carrier frames each having an opening therein and adapted to support an article, wrapper folding mechanism, a pair of spaced gripping members, means for intermittently moving said series of frames to position said frames and the articles carried thereby successively in substantial alignment with and between said spaced gripping members, means for moving and positioning a wrapper over a frame and its associated article, means for moving said gripping members relatively to one another to grip therebetween an article from a frame and a wrapper positioned thereover, means for thereupon moving said gripping members with the article and wrapper therebetween to carry them to said folding mechanism, one of said gripping members passing through said carrier frame, means associated with said folding mechanism for supporting said article and its wrapper to permit withdrawal of said one of said gripping members, and means for withdrawing said one gripping member through said frame to permit said series of carrier frames to be moved to position the next frame and its article in operative relation to said gripping devices.

28. In apparatus of the character described, in combination, a series of carrier frames each having an opening therein and adapted to support an article, wrapper folding mechanism, a pair of spaced gripping members, means for intermittently moving said series of frames to position said frames and the articles carried thereby successively in substantial alignment with and between said spaced gripping members, means for moving and positioning a wrapper over a frame and its associated article, means for moving said gripping members relatively to one another to grip therebetween an article from a frame and a wrapper positioned thereover, means for thereupon moving said gripping members with the article and wrapper therebetween to carry them to said folding mechanism, one of said gripping members passing through said carrier frame, a pair of folders adapted to fold end flaps formed by said folding mechanism inwardly against the underface of the article and adapted to be partially withdrawn to form a temporary support for the article and wrapper, thereby to permit the withdrawal of said one gripping member, and means for withdrawing said one gripping member through said frame to permit said series of carrier frames to be moved to position the next frame and its article in operative relation to said gripping devices.

29. In apparatus of the character described, in combination, a series of carrier frames each having an opening therein and adapted to support an article, wrapper folding mechanism, a pair of spaced gripping members, means for intermittently moving said series of frames to position said frames and the articles carried thereby successively in substantial alignment with and between said spaced gripping members, means for moving and positioning a wrapper over a frame and its associated article, means for moving said gripping members relatively to one another to grip therebetween an article from a frame and a wrapper positioned thereover, means for thereupon moving said gripping members with the article and wrapper therebetween to carry them to said folding mechanism, one of said gripping members passing through said carrier frame, a pair of auxiliary gripping members adapted to receive from said first-mentioned pair of gripping members said article and wrapper upon the partial completion of the wrapping operation by said folding mechanism, thereby to permit withdrawal of said one of said first-mentioned pair of gripping members, and means for withdrawing said one gripping member through said frame to permit said series of carrier frames to be moved to position the next frame and its article in operative relation to said gripping devices.

Signed at New York city, in the county of New York and State of New York, this 3rd day of January, A. D. 1921.

MILFORD BERRIAN FERGUSON.
EDWARD HAAS.